(12) United States Patent
Thevasahayam

(10) Patent No.: US 9,725,332 B2
(45) Date of Patent: Aug. 8, 2017

(54) TRANSITION METAL DICHALCOGENIDE AEROGELS AND METHODS OF PREPARATION AND USE

(71) Applicant: EMPIRE TECHNOLOGY DEVELOPMENT LLC, Wilmington, DE (US)

(72) Inventor: Arockiadoss Thevasahayam, Madurai (IN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 15 days.

(21) Appl. No.: 14/522,577

(22) Filed: Oct. 23, 2014

(65) Prior Publication Data

US 2015/0118467 A1 Apr. 30, 2015

(30) Foreign Application Priority Data

Oct. 24, 2013 (IN) .......................... 4797/CHE/2013

(51) Int. Cl.

| | |
|---|---|
| *H01B 1/02* | (2006.01) |
| *C01G 39/06* | (2006.01) |
| *H01G 11/00* | (2013.01) |
| *C01B 21/076* | (2006.01) |
| *C01B 19/00* | (2006.01) |
| *C01G 1/12* | (2006.01) |

(Continued)

(52) U.S. Cl.
CPC ............ *C01G 39/06* (2013.01); *C01B 19/007* (2013.01); *C01B 21/0768* (2013.01); *C01G 1/12* (2013.01); *H01G 11/00* (2013.01); *H01G 11/30* (2013.01); *H01G 11/86* (2013.01); *C01P 2002/20* (2013.01); *C01P 2004/20* (2013.01);

*C01P 2004/24* (2013.01); *C01P 2006/10* (2013.01); *C01P 2006/12* (2013.01); *C01P 2006/40* (2013.01); *Y02E 60/13* (2013.01)

(58) Field of Classification Search
CPC ........................................................ H01B 1/02
USPC ........................ 252/518.1; 423/508; 428/219
See application file for complete search history.

(56) References Cited

U.S. PATENT DOCUMENTS

2007/0272902 A1 11/2007 Evans et al.
2012/0034442 A1 2/2012 Pauzauskie et al.
(Continued)

FOREIGN PATENT DOCUMENTS

WO 2012028724 A1 3/2012
WO 2012101457 A1 8/2012

OTHER PUBLICATIONS

"Silica Aerogels", Retrieved from the <URL: https://web.archive.org/web/20140821112836/http://www.sps.aero/Key_ComSpace_Articles/TSA-009_White_Paper_Silica_Aerogels.pdf> on Aug. 21, 2014, pp. 1-41.

(Continued)

*Primary Examiner* — Khanh Tuan Nguyen
(74) *Attorney, Agent, or Firm* — Turk IP Law, LLC

(57) ABSTRACT

Methods of forming transition metal dichalcogenide aerogels are provided. Some methods include adding at least one solvent to one or more two-dimensional transition metal dichalcogenide sheets to form a transition metal dichalcogenide solution and freeze drying the transition metal dichalcogenide solution to form frozen transition metal dichalcogenide. The methods also include heating the frozen transition metal dichalcogenide to form a transition metal dichalcogenide aerogel.

13 Claims, 4 Drawing Sheets

(51) Int. Cl.
H01G 11/30 (2013.01)
H01G 11/86 (2013.01)

(56) References Cited

U.S. PATENT DOCUMENTS

| | | |
|---|---|---|
| 2012/0073957 A1 | 3/2012 | Dahmani |
| 2012/0208002 A1 | 8/2012 | Todd et al. |
| 2013/0202890 A1* | 8/2013 | Kong ............. H01B 1/02 428/402 |

OTHER PUBLICATIONS

"Silicon Rival MoS2 Promises Small, Low-Energy Chips", BBC News Technology, Dec. 5, 2011 Last Updated at 17:19, Retrieved from the <URL: https://web.archive.org/web/20120307141610/http://www.bbc.co.uk/news/technology-16034693?> on Aug. 22, 2014, pp. 1-3.
Andres Castellanos-Gomez et al., "Mechanical Properties of Freely Suspended Semiconducting Graphene-Like Layers Based on MoS2", Nanoscale Research Letters, 2012, pp. 1-7, vol. 7, No. 233.
David L. Chandler, "One-Molecule-Thick Material Has Big Advantages", Aug. 23, 2012, Retrieved from the <URL: http://newsoffice.mit.edu/2012/graphene-molybdenum-disulfide-flat-materials-0823> on Aug. 21, 2014, pp. 1-3.
Maher F. El-Kady et al., "Laser Scribing of High Performance and Flexible Graphene-Based Electrochemical Capicitors", Mar. 16, 2012, pp. 1326-1330, vol. 335.
B. Radisavljevic et al., "Single-Layer MoS2 Transistors", Nature Nanotech, Mar. 2011, pp. 147-150, vol. 6.
Yi-Hsien Lee et al., "Synthesis of Large-Area MoS2 Atomic Layers with Chemical Vapor Deposition", 2012, pp. 2320-2325, vol. 24, Issue 17.
S. J. Mei, "Molybdenum Sulfide as Electrochemical Supercapacitors", in Structure-Property Relationships of Inorganic Semiconductor Materials, Chapter 4, 2007, pp. 97-151.
Son Truong Nguyen et al., "Morphology Control and Thermal Stability of Binderless-Graphene Aerogels from Graphite for Energy Storage Applications", Colloids and Surfaces A: Physicochemical and Engineering Aspects, 2012, pp. 352-358, vol. 414.
Han Wang et al., "Integrated Circuits Based on Bilayer MoS2 Transistors", Nano Letters, 2012, pp. 4674-4680, vol. 12, No. 9, American Chemical Society.
Jian Wang et al., "Graphene Aerogels", ECS Transactions, 2009, pp. 241-247, vol. 19, No. 5.
Justin Wade Williamson, "Characterizing Cigarette Lighter Flames to Reduce Unwanted Ignition", Thesis submitted to the Faculty of the Graduate School of the University of Maryland, 2003, pp. 1-93.
Jung Joon Yoo et al., "Ultrathin Planar Graphene Supercapacitors", Nano Letters, 2011, pp. 1423-1427, vol. 11, No. 4, American Chemical Society.

\* cited by examiner

TRANSITION METAL DICHALCOGENIDE AEROGELS AND METHODS OF PREPARATION AND USE

CROSS-REFERENCE TO RELATED APPLICATIONS

This application claims priority to Indian Patent Application 4797/CHE/2013, filed on Oct. 24, 2013 and entitled "Transition Metal Dichalcogenide Aerogels and Methods of Preparation and Use" (the "First Indian Patent Application"). The First Indian Patent Application, including any appendices or attachments thereof, is incorporated by reference herein in its entirety.

This application is also related to U.S. patent application Ser. No. 14/520,358, filed on Oct. 22, 2014 and entitled "Two-Dimensional Transition Metal Dichalcogenide Sheets and Methods of Preparation and Use." This related application claims priority to Indian Patent Application 4799/CHE/2013, filed on Oct. 24, 2013 and entitled "Two-Dimensional Transition Metal Dichalcogenide Sheets and Methods of Preparation and Use" (the "Second Indian Patent Application"). Both of the related application and the Second Indian Patent Application, including any appendices or attachments thereof, are incorporated by reference herein in their entirety.

BACKGROUND

Aerogels, due to their high surface area and low densities, find applications in chemical, electronic and optical applications. For example, some aerogels are used as catalysts for synthesizing chemicals or forming electrodes in batteries and supercapacitors. Some materials that are used as aerogels include silica, graphene and carbon nanotubes. However, these aerogels are rigid, brittle in nature, crack easily when immersed in water and are expensive.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Briefly, in accordance with one aspect, a method of forming a transition metal dichalcogenide aerogel is provided. The method includes adding at least one solvent to one or more two-dimensional transition metal dichalcogenide sheets to form a transition metal dichalcogenide solution. The method also includes freeze drying the transition metal dichalcogenide solution to form frozen transition metal dichalcogenide and heating the frozen transition metal dichalcogenide to form a transition metal dichalcogenide aerogel.

In accordance with another aspect, a method of forming a transition metal dichalcogenide aerogel is provided. The method includes mixing at least one inorganic oxide with one or more two-dimensional transition metal dichalcogenide sheets to form a mixture and adding at least one solvent to the mixture to form a two-dimensional transition metal dichalcogenide solution. The method also includes freeze drying the two-dimensional transition metal dichalcogenide solution to form frozen transition metal dichalcogenide and heating the frozen transition metal dichalcogenide to form a transition metal dichalcogenide aerogel.

In accordance with another aspect, a $MoS_2$ aerogel is provided. The $MoS_2$ aerogel has an electrical conductivity of about 3.4 S/m to about to about 40 S/m.

In accordance with another aspect, a device including $MoS_2$ aerogel is provided. The device has an electrical conductivity of about 3.4 S/m to about 40 S/m.

DETAILED DESCRIPTION

Figure 1:
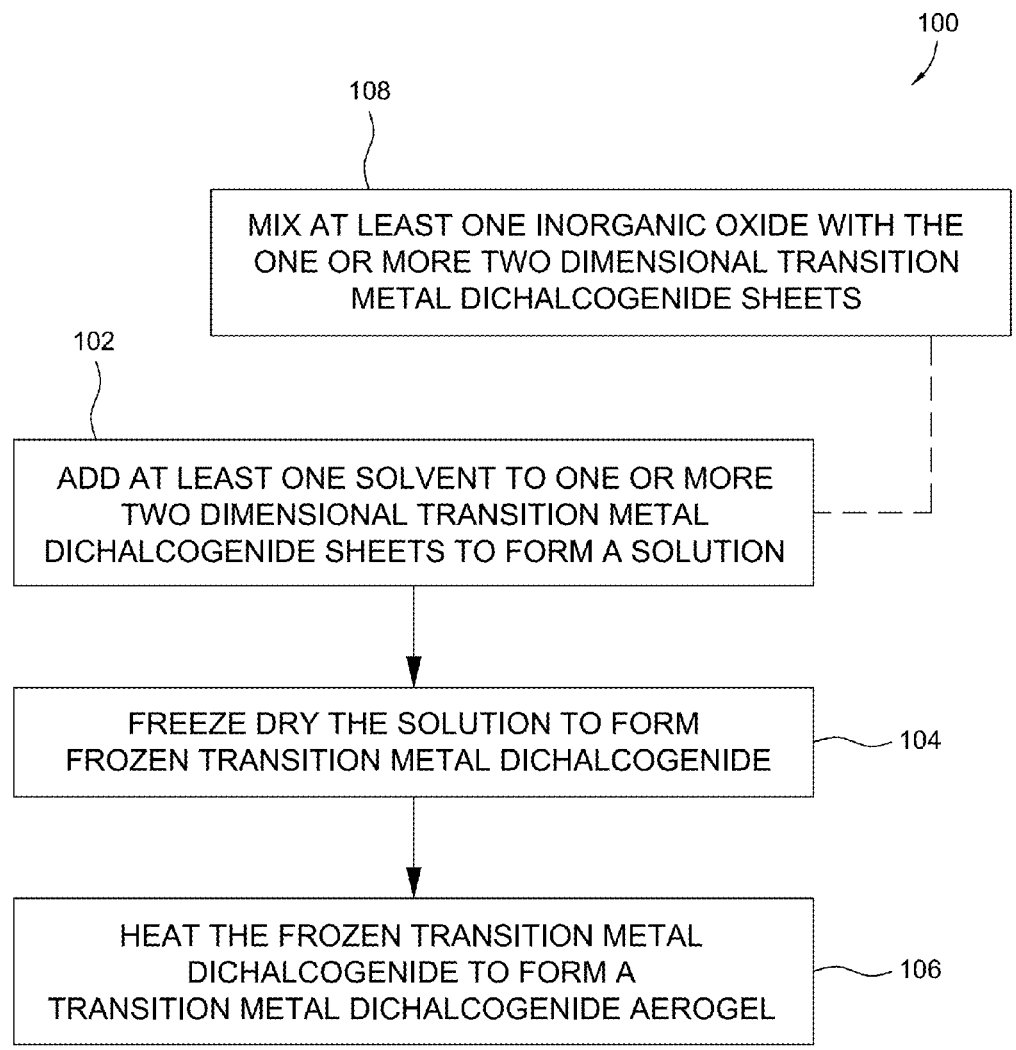
FIG. 1 is an example flow diagram of an embodiment for a method of forming a transition metal dichalcogenide aerogel.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof. While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

Some embodiments are generally directed to techniques of forming transition metal dichalcogenide aerogels using two dimensional transition metal dichalcogenide sheets such as molybdenum disulphide ($MoS_2$) sheets. Such aerogels may be used in a variety of electronic devices such as supercapacitors, sensors, photodetectors and batteries. The technique provides a simple and cost effective process for forming aerogels with substantially high bulk densities, resistance to fracture and high electrical conductivity. The process is easily scalable for industrial and other applications.

Referring now to FIG. 1, an example flow diagram 100 of an embodiment for a method of forming a transition metal dichalcogenide aerogel is provided. At block 102, at least one solvent is added to the one or more two-dimensional transition metal dichalcogenide sheets to form a transition metal dichalcogenide solution. In some examples, the one or more two-dimensional transition metal dichalcogenide sheets include molybdenum disulphide ($MoS_2$), tungsten disulphide ($WS_2$), titanium disulphide ($TiS_2$), tantalum (IV) sulphide ($TaS_2$), zirconium disulphide ($ZrS_2$), or combinations thereof. Examples of the at least one solvent include, but are not limited to, ethanol, methanol, isopropyl alcohol, or combinations thereof. In one example embodiment, a concentration of the at least one solvent is about 10 weight (wt) % to about 15 wt %. Specific examples of the concentration include about 10 wt %, about 11 wt %, about 12 wt %, about 13 wt %, about 14 wt %, about 15 wt % and ranges between any two of these values (including endpoints).

At block 104, the two-dimensional transition metal dichalcogenide solution is freeze dried to form frozen transition metal dichalcogenide. The transition metal dichalcogenide solution may be freeze dried using various techniques such as by ice bath and salt or lyophilization. In one example, the transition metal dichalcogenide solution is sonicated prior to freeze drying for a time period of about 30 minutes to about 45 minutes at a power of about 170 Watts (W) and a duty cycle of about 180 seconds/cycle. Specific examples of the sonication time include about 30 minutes, about 35 minutes, about 40 minutes, about 45 minutes and ranges between any two of these values (including endpoints). In some examples, the transition metal dichalcogenide solution is subjected to about 10 to about 15 sonication cycles.

At block 106, the frozen transition metal dichalcogenide is heated to form a transition metal dichalcogenide aerogel. In one example embodiment, the frozen transition metal dichalcogenide is heated in an inert atmosphere at a temperature of about 175° C. to about 250° C. Specific examples of the temperature include about 175° C., about 190° C., about 205° C., about 220° C., about 235° C., about 250° C. and ranges between any two of these values (including endpoints). In some examples, the frozen transition metal dichalcogenide is heated for a time period of about 20 minutes to about 45 minutes. Specific examples of the heating time include about 20 minutes, about 25 minutes, about 30 minutes, about 35 minutes, about 40 minutes, about 45 minutes and ranges between any two of these values (including endpoints).

In certain embodiments, at least one inorganic oxide is mixed with the one or more two-dimensional transition metal dichalcogenide sheets prior to forming the two-dimensional transition metal dichalcogenide solution (block 108). Examples of the at least one inorganic oxide include, but are not limited to, boric oxide ($B_2O_3$), barium oxide (BaO), praseodymium oxide ($Pr_2O_3$), lanthanide oxide ($Ln_2O_3$), manganese dioxide ($MnO_2$), or combinations thereof. In one example, about 0.75 milligram (mg) to about 1.5 mg of boric oxide is added to the one or more two-dimensional transition metal dichalcogenide sheets. Specific example of the mass of boric oxide includes about 0.75 mg, about 0.90 mg, about 1 mg, about 1.1 mg, about 1.2 mg, about 1.3 mg, about 1.4 mg, about 1.5 mg and ranges between any two of these values (including endpoints).

In some examples, an electrical conductivity of the transition metal dichalcogenide aerogel formed using the above-described process is about 3.4 Siemens/meter (S/m) to about 40 S/m. Specific examples of the electrical conductivity include about 3.4 S/m, about 10 S/m, about 15 S/m, about 20 S/m, about 25 S/m, about 30 S/m, about 35 S/m, about 40 S/m and ranges between any two of these values (including endpoints). In some other examples, the transition metal dichalcogenide aerogel provides a thermal insulation at a temperature of about 1000 Kelvin (K) to about 1500 K. Specific example of the thermal insulation temperature include about 1000 K, about 1100 K, about 1200 K, about 1300 K, about 1400 K, about 1500 K and ranges between any two of these values (including endpoints).

Figure 2:
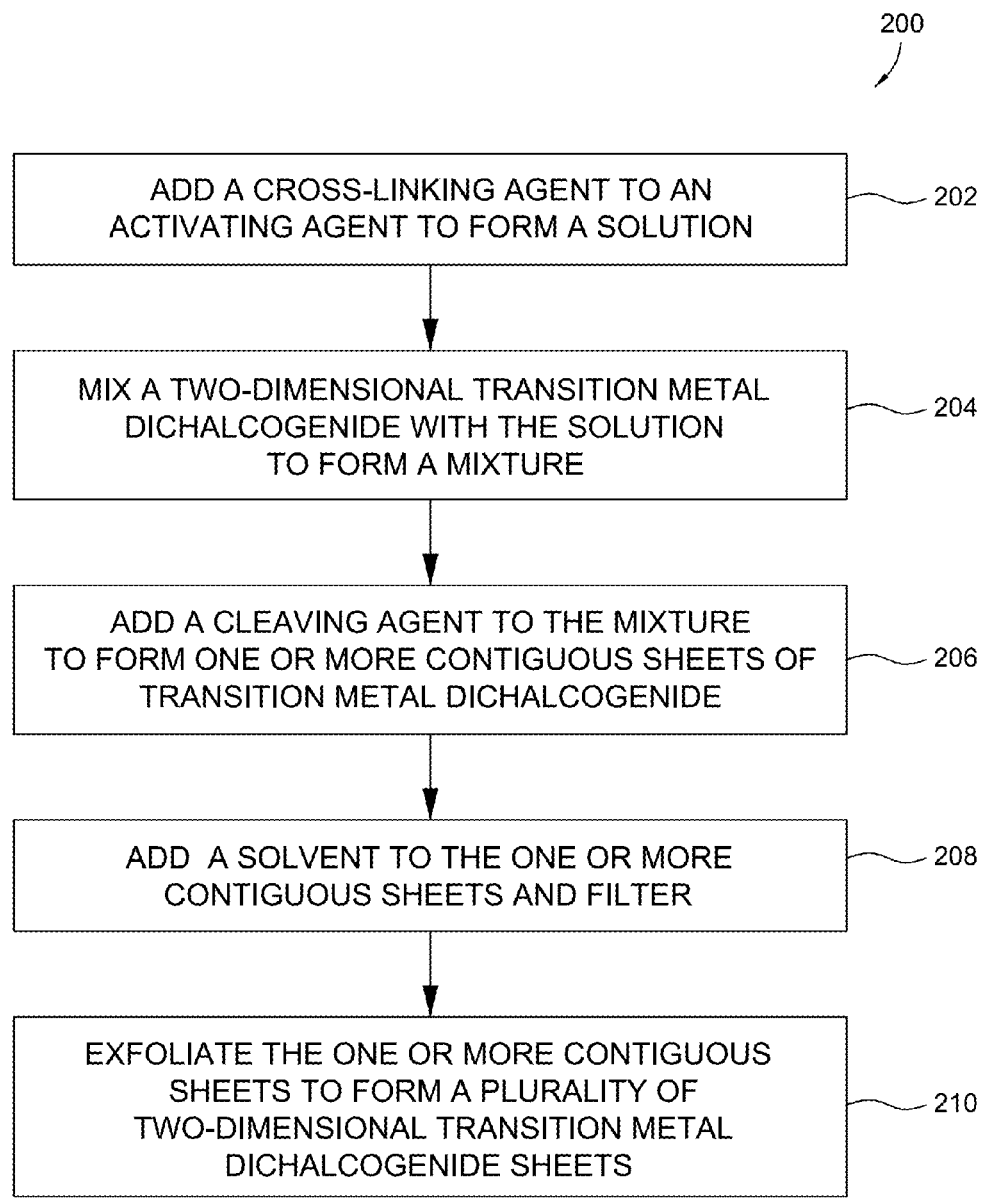
FIG. 2 is an example flow diagram of an embodiment for a method of forming two-dimensional transition metal dichalcogenide sheets.

In certain embodiments, the one or more two-dimensional transition metal dichalcogenide sheets such as $MoS_2$ sheets are formed by reacting a transition metal dichalcogenide with a cross-linking agent and an activating agent to form a mixture. Further, a cleaving agent is added to the mixture to form one or more contiguous transition metal dichalcogenide sheets. Referring now to FIG. 2, an example flow diagram 200 of an embodiment for a method of forming a two-dimensional transition metal dichalcogenide sheets is provided. At block 202, a cross-linking agent is added to an activating agent to form a solution. Examples of the cross-linking agent include, but are not limited to, 1-ethyl-3-[3-dimethylaminopropyl]carbodiimide hydrochloride (EDC), cystamine ($C_4H_{12}N_2S_2 \cdot 2HCl$), N,N'-dicyclohexylcarbodiimide (DCC), 3,3'-dithiobis(sulfosuccinimidylpropionate) (DTSSP), tris(2-carboxyethyl) phosphine hydrochloride (TCEP-HCl), dithiothreitol (DTT), or combinations thereof. In one embodiment, the cross-linking agent is mixed with distilled water to form a solution prior to adding the activating agent.

In one example, a concentration of the cross-linking agent is about 33.3 millimoles (mmol) to about 66.6 mmol dissolved in about 1 milliliter (ml) of water. Specific examples of the concentration of the cross-linking agent include about 33.3 mmol, about 44.4 mmol, about 55.5 mmol, about 66.6 mmol and ranges between any two of these values (including endpoints). Examples of the activating agent include, but are not limited to ammonia ($NH_3$), tetramethyl ammonium hydroxide (TMAH), or combinations thereof. In one example embodiment, the pH of the activating agent is maintained at about 6.8 to about 7.1. Specific examples of the pH value include about 6.8, about 6.9, about 7.0, about 7.1 and ranges between any two of these values (including endpoints).

At block 204, a two-dimensional transition metal dichalcogenide is mixed with the above-prepared solution to form a mixture. Examples of the two-dimensional transition metal dichalcogenide include, but are not limited to, molybdenum disulphide ($MoS_2$), tungsten disulphide ($WS_2$), titanium disulphide ($TiS_2$), tantalum (IV) sulphide ($TaS_2$), zirconium disulphide ($ZrS_2$), bismuth telluride ($Bi_2Te_3$), bismuth selenide ($Bi_2Se_3$), titanium nitride chloride (TiNCl), antimony telluride ($Sb_2Te_3$), melonite ($NiTe_2$), or combinations thereof. In some examples, the two-dimensional transition metal dichalcogenide sheets comprise $MX_2$, where M is Mo, W, Bi, Sb, Ti, Pt, Nb, Ta, Ni, Zr, Hf, V, Ta, Pd, and X is S, Se, Te, NCl. In one example embodiment, mass of the two-dimensional transition metal dichalcogenide is about 25 milligrams (mg) to about 75 mg. Specific examples of the mass of the two-dimensional transition metal dichalcogenide include about 25 mg, about 35 mg, about 45 mg, about 55 mg, about 65 mg, about 75 mg, and ranges between any two of these values (including endpoints).

At block 206, a cleaving agent is added to the mixture to form one or more contiguous sheets of transition metal dichalcogenide. Examples of the cleaving agent include, but are not limited to, N-hydroxysuccinimide (NHS), N-hydroxysulfosuccinimide (Sulfo-NHS), or combinations thereof. The cleaving agent is mixed with distilled water prior to adding the cleaving agent to the mixture. In one example, a concentration of the cleaving agent is about 33.3 millimoles (mmol) to about 66.6 mmol dissolved in about 1 milliliter (ml) of water. Specific examples of the concentration of the cross-linking agent include about 33.3 mmol, about 44.4 mmol, about 55.5 mmol, about 66.6 mmol and ranges between any two of these values (including endpoints). In this embodiment, the solution formed by adding the cleaving agent to the mixture is stirred continuously and is ultra-centrifuged to remove particulate matter such as unwanted chemicals and residues. In one example embodiment, the solution is stirred at a temperature of about 125° C. to about 200° C. Specific examples of the temperature include about 125° C., about 135° C., about 145° C., about 155° C., about 165° C., about 175° C., about 185° C., about 195° C., about 200° C. and ranges between any two of these values (including endpoints).

In this embodiment, the cross-linking agent such as EDC functions as a linker between chalcogen ions (such as sulphur to sulphur bond of $MoS_2$) of the two-dimensional transition metal dichalcogenide. Moreover, the cleaving agent such as NHS cleaves the bond between chalcogen ions (for example, sulphur) and the cross-linking agent.

At block 208, at least one solvent is added to the one or more contiguous sheets and the mixture is subsequently sonicated to remove unreacted agents. Examples of solvent include, but are not limited to, ethanol, methanol, isopropyl alcohol, or combinations thereof. In one embodiment, the mixture is sonicated for about 30 minutes. The mixture can be filtered to form multi-layered contiguous sheets of transition metal dichalcogenide. In one example, the mixture is filtered through a PVDF membrane having a pore size of about 0.2 microns.

At block 210, the one or more contiguous sheets can be exfoliated to form a plurality of two-dimensional transition metal dichalcogenide sheets. In one embodiment, the one or more contiguous sheets of transition metal dichalcogenide are exposed to electromagnetic radiation to form the plurality of two-dimensional transition metal dichalcogenide sheets. Examples of the electromagnetic radiation include, but are not limited to, thermal radiation, solar radiation, microwave radiation, or combinations thereof. In one example embodiment, the one or more contiguous sheets of transition metal dichalcogenide are heated to a temperature of about 125° C. to about 175° C. at a pressure of about 1 atmosphere (atm) to about 2 atm. Specific examples of the temperature include about 125° C., about 135° C., about 145° C., about 155° C., about 165° C., about 175° C. and ranges between any two of these values (including endpoints). Specific examples of the pressure include about 1 atm, about 1.2 atm, about 1.4 atm, about 1.6 atm, about 1.8 atm, about 2.0 atm, and ranges between any two of these values (including endpoints).

In this embodiment, the one or more contiguous sheets are exfoliated owing to substantially weak Van der Waals interactions between the layers. The solvent dispersed within the multi-layered stack of the transition metal dichalcogenide sheets is evaporated as the stack is exposed to electromagnetic radiation thereby exfoliating thin two-dimensional transition metal dichalcogenide sheets.

In some examples, an area of the $MoS_2$ sheets formed using the above-described process is about 1 $cm^2$ to about 25 $cm^2$. Specific examples of the area include about 1 $cm^2$, about 5 $cm^2$, about 10 $cm^2$, about 15 $cm^2$, about 20 $cm^2$, about 25 $cm^2$, and ranges between any two of these values (including endpoints). In some other examples, a thickness of the $MoS_2$ sheets is about 50 nanometers to about 100 microns. Specific examples of the thickness include about 0.05 microns, about 0.1 microns, about 1 micron, about 10 microns, about 50 microns, about 100 microns and ranges between any two of these values (including endpoints). In some examples, a capacitance of the $MoS_2$ sheets is about 1 nanofarad (nF) to about 100 nF. Specific examples of the capacitance include about 1 nF, about 10 nF, about 30 nF, about 50 nF, about 70 nF, about 90 nF, about 100 nF and ranges between any two of these values (including endpoints).

In one example, $MoS_2$ aerogel is formed using the process of FIG. 1. The $MoS_2$ aerogel is formed by freeze drying the two-dimensional transition metal dichalcogenide solution of $MoS_2$ sheets and boric oxide dispersed in diluted ethanol to form frozen transition metal dichalcogenide. The frozen transition metal dichalcogenide is then heated in nitrogen atmosphere. In some examples, an electrical conductivity of the formed $MoS_2$ aerogel is about 3.4 Siemens/meter (S/m) to about 40 S/m. Specific examples of the electrical conductivity include about 3.4 S/m, about 10 S/m, about 15 S/m, about 20 S/m, about 25 S/m, about 30 S/m, about 35 S/m, about 40 S/m and ranges between any two of these values (including endpoints).

In some other examples, the $MoS_2$ aerogel has a density of about 0.015 grams per cubic centimeter ($gm/cm^3$) to about 0.15 $gm/cm^3$. Specific examples of the density include about 0.015 $gm/cm^3$, about 0.03 $gm/cm^3$, about 0.06 $gm/cm^3$, about 0.09 $gm/cm^3$ about 0.15 $gm/cm^3$ and ranges between any two of these values (including endpoints). In some examples, a surface area of the $MoS_2$ aerogel is about 500 $m^2/gm$ to about 1100 $m^2/gm$. Specific examples of the surface area include about 500 $m^2/gm$, about 600 $m^2/gm$, about 700 $m^2/gm$, about 800 $m^2/gm$, about 900 $m^2/gm$, about 1000 $m^2/gm$, about 1100 $m^2/gm$ and ranges between any two of these values (including endpoints).

In some example embodiments, a device including MoS2 aerogel is formed. Examples of the device include, but are not limited to, field-effect transistors, electrodes, sensors, photodetectors, capacitors, solar cells, light emitting diodes, thermoelectric devices, or combinations thereof. In one example, the device is a supercapacitor.

In some examples, a specific capacitance of the supercapacitor formed using the $MoS_2$ gel is about 2400 Farad/gram (F/gm) to about 7500 F/gm. Specific examples of capacitance include about 2400 F/gm, about 3400 F/gm, about 4400 F/gm, about 5400 F/gm, about 6400 F/gm, about 7500 F/gm and ranges between any two of these values (including endpoints). In some examples, an energy density of the supercapacitor is about 15 Watt hour/gram (Wh/gm) to about 50 Wh/gm. Specific examples of the energy density include about 15 Wh/gm, about 20 Wh/gm, about 25 Wh/gm, about 30 Wh/gm, about 35 Wh/gm, about 40 Wh/gm, about 45 Wh/gm, about 50 Wh/gm, and ranges between any two of these values (including endpoints).

In some other examples, a power density of the supercapacitor formed using the $MoS_2$ gel is about 375 Watt/kilogram (W/kg) to about 1200 W/kg. Specific examples of the power density include about 375 W/kg, about 475 W/kg, about 575 W/kg, about 675 W/kg, about 775 W/kg, about 875 W/kg, about 975 W/kg, about 1075 W/kg, about 1175 W/kg, about 1200 W/kg, and ranges between any two of these values (including endpoints).

In some examples, macroscopic three-dimensional (3D) $MoS_2$ aerogel assemblies are formed using the $MoS_2$ aerogel. Such assemblies have relatively high conductivity, high surface area and enhanced resistance to fracture as compared to other aerogels. It should be noted that the assemblies can be used in a number of consumer electronics such as structural support for batteries, supercapacitors, electrodes for batteries and sensors.

EXAMPLES

The present invention will be described below in further detail with examples and comparative examples thereof, but it is noted that the present invention is by no means intended to be limited to these examples.

Example 1: Formation of $MoS_2$ Sheets $MoS_2$ sheets were formed using the process of FIG. 2. A biochemical buffer with about 50 ml of ammonia solution obtained from Molychem Pvt. Ltd., India was prepared and the pH of the biochemical buffer was adjusted to be about 6.9. Further, about 50 millimole of 1-ethyl-3-(3-dimethyl-aminopropyl) carbodimide hydrochloride (EDC) obtained from Sigma-Aldrich, India was dissolved in about 1 ml of milli Q water. The above solutions were mixed and about 50 mg of amorphous molybdenum disulphide (obtained from Molychem Pvt. Ltd., India) was added and the mixture was stirred for about 10 minutes at room temperature.

Further, a solution of 50 mmol of N-hydroxysuccinimide dissolved in about 1 ml of Q water was added to the above mixture. This solution was subsequently stirred for 6 hours at a temperature of about 150° C. Here, EDC acted as a linker between sulphur to sulphur atoms of $MoS_2$ whereas NHS acted as a cleaving agent and cleaved the bond between sulphur and EDC, thereby combining the two sulphurs. The above solution was washed with milli Q water and was ultra-centrifuged to remove unwanted chemicals and residues. Next, about 50 ml of ethanol was added and the solution was sonicated for about 10 minutes and filtered through polyvinylidene difluoride (PVDF) membrane having a pore size of about 0.2 microns. The membrane was removed and the filtrate was heated at a temperature of about 50° C. for about 10 minutes to separate the $MoS_2$ multilayered stack from the PVDF membrane.

Example 2: Characterization of the $MoS_2$ Sheets

The multi-layered $MoS_2$ sheets of Example 1 were characterized using a colorimeter for sulphide-sulphide bond continuity. Here, colorimetric assay using reagent 2-nitro-5-thiosulfobenzoate was used for determination of disulfide bond. The color of the formed crystal was observed to be light green, which indicated that the bonds were continuous. The multi-layered $MoS_2$ stack had a continuous surface that indicated that the sheets were continuous. The thickness of the multi-layered $MoS_2$ sheets was measured to be about 3.5 microns.

Example 3: Exfoliation of $MoS_2$ Sheets

The multi-layered $MoS_2$ stacked sheets of Example 1 were thermally exfoliated to obtain molybdenum disulphide ($MoS_2$) sheets. The multi-layered $MoS_2$ sheets were transferred to a stainless steel vessel and were induction heated to a temperature of about 50° C. containing air at about 1 atm pressure for about 10 minutes to about 15 minutes. Subsequently, the temperature was raised to about 150° C. and was maintained at about 150° C. for a time period of about 5 minutes to about 6 minutes. Here, ethanol dispersed within the $MoS_2$ multilayered stacks was evaporated due to the induction heat and resulted in exfoliation of $MoS_2$ multilayered stacks to thin $MoS_2$ sheets having a thickness of about 3.5 microns.

Example 4: Characterization of the Exfoliated $MoS_2$ Sheets

The exfoliated $MoS_2$ sheet was observed to be transparent. Here, the electrical resistivity of the sample was measured using the standard four probe technique and was estimated to be about 222.5 ohm centimeters ($\Omega$cm). Further, the specific capacitance of the sample was measured to be about 1.29 nano Farad (nF).

Example 5: Formation of $MoS_2$ Aerogel

The $MoS_2$ aerogel was formed using the example process of FIG. 1. The $MoS_2$ sheet weighing about 1 gm was mixed with about 1 mg of boric oxide and the mixture was dispersed in about 10 ml of ethanol diluted with about 90 ml of DI water to form a solution. This solution was sonicated for a time period of about 30 minutes with a power factor of about 170 W and a duty cycle of about 180 s/cycle to obtain consistency. The above solution was then freeze dried using ice bath and salt. After freeze drying, the sample was transferred to a quartz boat and was heated at a temperature of about 200° C. for a time period of about 30 minutes in a closed furnace.

Example 6: Characterization of the $MoS_2$ Aerogel

Figure 3:
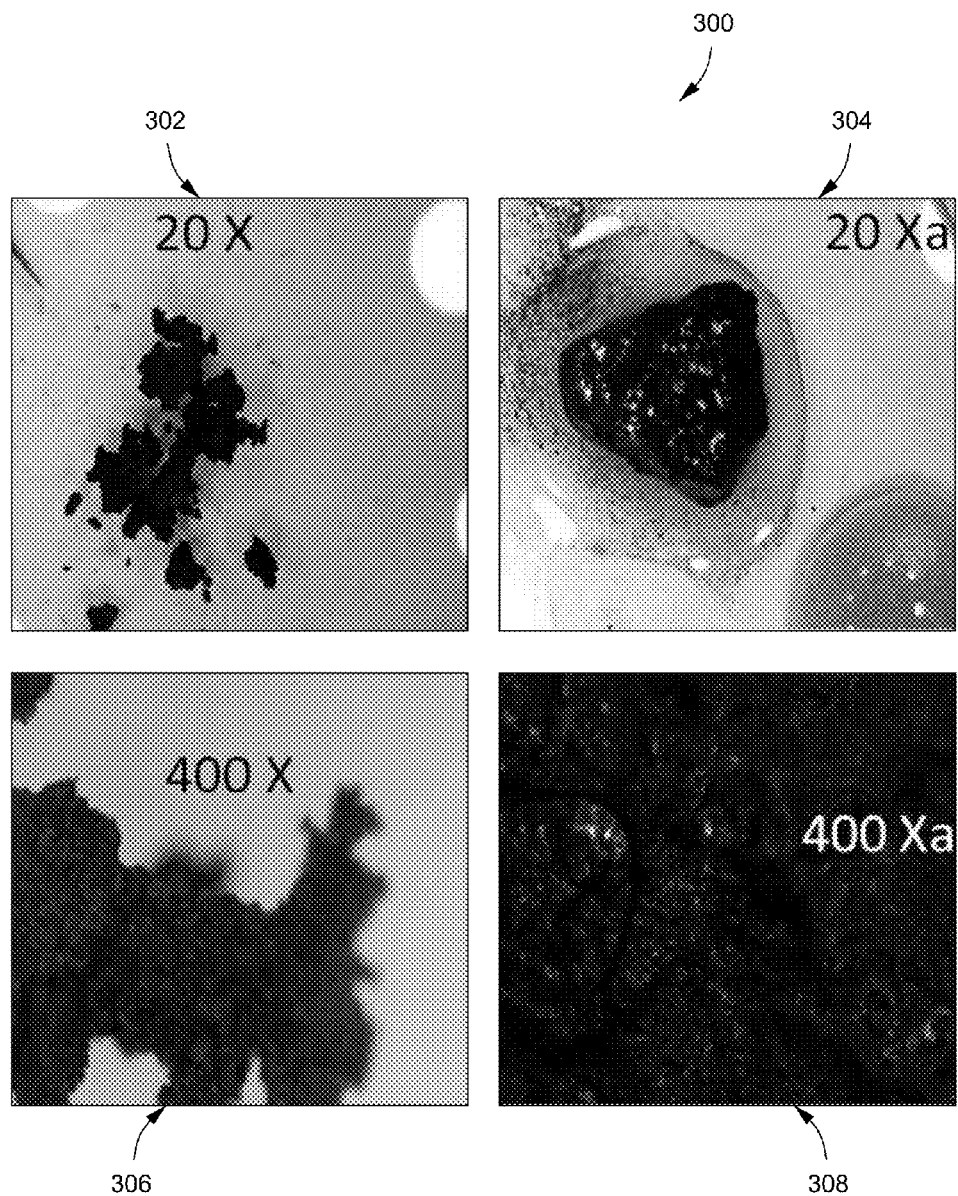
FIG. 3 illustrates example images of $MoS_2$ aerogel.

The $MoS_2$ aerogel of Example 5 was characterized for its physical properties, such as surface area, thermal insulation, and deformation under weight. FIG. 3 illustrates images 300 of the $MoS_2$ aerogel formed using the process of Example 5. The images 302, 304, 306 and 308 represent the images obtained at resolutions of 20×, 20× a, 400× and 400× a respectively. The percentage of solids in the $MoS_2$ aerogel was estimated to be about 0.1% to about 15%.

The $MoS_2$ aerogel was also exposed to a commercially available cigarette lighter to evaluate its thermal insulation properties. The $MoS_2$ aerogel was exposed to a temperature of about 1000 K to about 1500 K for about 30 minutes and no degradation was observed implying the thermal insulation at these temperatures. Further, surface area determination for the $MoS_2$ aerogel was performed using Brunauer-Emmett-Teller (BET) method in nitrogen atmosphere. The $MoS_2$ aerogel weighing about 0.1 gm was heated to a temperature of about 150° C. under vacuum at a pressure of about 10 Torr to about 15 Torr for a time period of about 24 hours to remove all the adsorbed species. The surface area of the $MoS_2$ aerogel without boric oxide determined using BET method for different initial weights is provided in Table 1:

TABLE 1

| Temperature ° C. | Process | Initial weight (gm) a | Time (hr) | Pressure (psi) | Final weight (gm) b | BET SA $m^2$/g (b − a)*2*980.67 |
|---|---|---|---|---|---|---|
| 30 | Absorption | 0.5 | 1 | 30 | 0.76 | 549.17 |
| 100 | Desorption | 0.76 | 1 | 30 | 0.53 | 450.10 |
| 30 | Absorption | 0.5 | 2 | 30 | 0.84 | 666.85 |
| 100 | Desorption | 0.84 | 2 | 30 | 0.55 | 568.78 |
| 30 | Absorption | 0.5 | 3 | 30 | 0.86 | 706.08 |
| 100 | Desorption | 0.86 | 3 | 30 | 0.55 | 617.82 |

Figure 4:
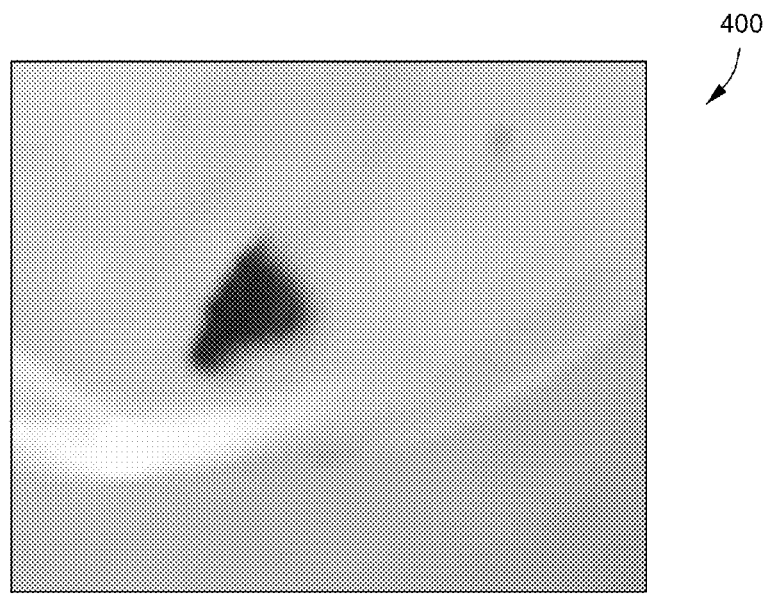
FIG. 4 is an example image of the $MoS_2$ aerogel immersed in water.

The bulk densities of the $MoS_2$ aerogel were determined from physical dimensions and mass of each sample and were estimated to be about 0.02 gm/$cm^3$ to about 0.15 gm/$cm^3$. The bulk density of the $MoS_2$ aerogel was observed to be relatively higher than the density of silica aerogel owing to relatively high molecular weight of molybdenum and sulphur. Moreover, brittle strength of the formed $MoS_2$ aerogel was evaluated. The $MoS_2$ aerogel of Example 5 was immersed in water for a time period of about 30 minutes. FIG. 4 is an example image 400 of the $MoS_2$ aerogel immersed in water. The weight of the sample was measured before and after immersion, and it was observed to be substantially same implying that the $MoS_2$ aerogel remained intact within the water thus exhibiting resistance to cracks when exposed to water.

Example 7: Electrical Properties of the $MoS_2$ Aerogel

The bulk electrical conductivity of the $MoS_2$ aerogel was measured using four-probe method with metal electrodes attached to the ends of samples using silver paste. The bulk electrical conductivity of the $MoS_2$ aerogel was measured to be about 40 S/m for pure $MoS_2$ aerogel and about 3.4 S/m for $MoS_2$ gel having about 0.1 wt % of boric oxide. The relatively higher values of conductivity were observed due to substantially large reduction in resistance at the junctions between $MoS_2$ sheets. The physical properties for the $MoS_2$ aerogel with and without boric oxide are provided in Table 2:

TABLE 2

| Initial wt % boric oxide | Density g/cm$^3$ | BET surface area (m$^2$/gm) | Electrical conductivity (S/m) |
|---|---|---|---|
| 0 | 0.112 | 649 | 40 |
| 0.1 | 0.015 | 1167 | 3.44 |

Example 8: Fabrication of a Supercapacitor Using $MoS_2$ Aerogel

A supercapacitor was fabricated using the $MoS_2$ aerogel formed using the present technique. Here, about 1.150 mg of chemically and thermally exfoliated $MoS_2$ sheets were dispersed in about 750 µl of Nafion solution by sonication. The mixture of the $MoS_2$ sheets and the Nafion solution was sonicated for about 3 minutes. Two pieces of carbon cloth having an area of about 2 cm×2 cm were heated at a temperature of about 100° C. The solution formed by dispersing the $MoS_2$ sheets in Nafion solution was sprayed on the heated carbon cloths and then the carbon cloths were dried for about 5 minutes.

Further, about 3 g of polyvinyl alcohol (PVA) was dissolved in about 100 ml of DI water and the resultant solution was dried in a petri dish to form a PVA film. The PVA film was placed between the two carbon cloths to form the supercapacitor.

Example 9: Characterization of the Supercapacitor of Example 8

Figure 5:
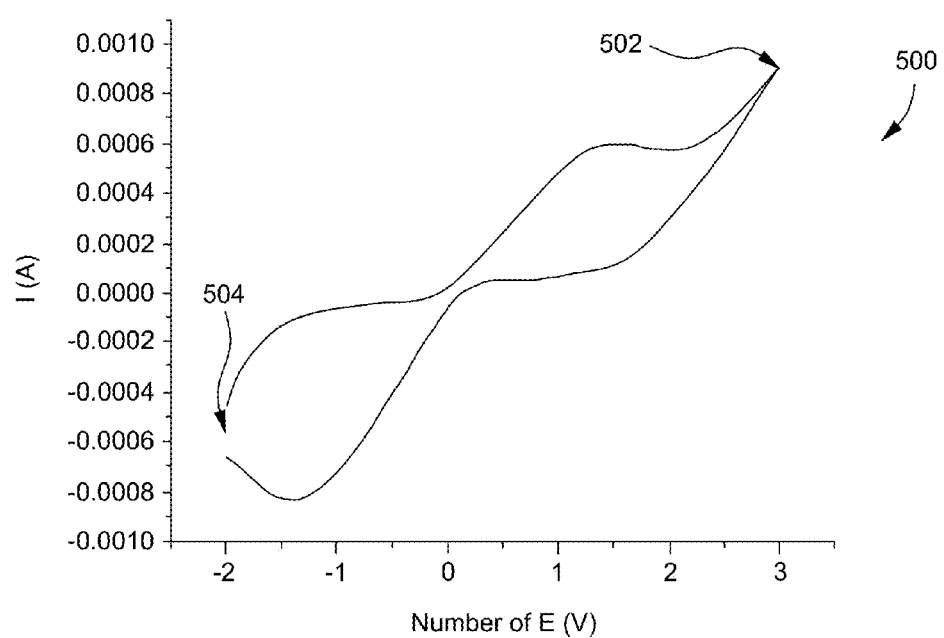
FIG. 5 is an example cyclic voltammetry plot for a supercapacitor fabricated using $MoS_2$ aerogel.

The performance of the supercapacitor of Example 7 formed using $MoS_2$ aerogel was evaluated using cyclic voltammetry. FIG. 5 is a graphical representation of cyclic voltammetry results 500 for the supercapacitor of Example 7. As can be seen from the cyclic voltammetry plot, the proposed supercapacitor provides a wide operating potential of about +3 volts to about −2 volts for storing charge shown by reference numerals 502 and 504 respectively.

Moreover, the specific capacitance of the supercapacitor was estimated to be about 2400 F/gm to about 7500 F/gm and the energy density of the supercapacitor was estimated to be about 15 Wh/gm to about 50 Wh/gm. Further, the power density of the supercapacitor was estimated to be about 375 W/kg to about 1200 W/kg.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of forming a transition metal dichalcogenide aerogel, the method comprising:
    adding a cleaving agent to a transition metal dichalcogenide mixture to form one or more two-dimensional transition metal dichalcogenide sheets;
    adding at least one solvent to the one or more two-dimensional transition metal dichalcogenide sheets to form a transition metal dichalcogenide solution;
    freeze drying the transition metal dichalcogenide solution to form a frozen transition metal dichalcogenide; and
    heating the frozen transition metal dichalcogenide to form the transition metal dichalcogenide aerogel.

2. The method of claim 1, wherein adding the at least one solvent to the one or more two-dimensional transition metal dichalcogenide sheets comprises adding the at least one solvent to molybdenum disulphide ($MoS_2$), tungsten disulphide ($WS_2$), titanium disulphide ($TiS_2$), tantalum (IV) sulphide ($TaS_2$), zirconium disulphide ($ZrS_2$), bismuth telluride ($Bi_2Te_3$), bismuth selenide ($Bi_2Se_3$), titanium nitride chloride (TiNCl), antimony telluride ($Sb_2Te_3$), melonite ($NiTe_2$), or combinations thereof.

3. The method of claim 1, wherein adding at least one solvent to the one or more two-dimensional transition metal dichalcogenide sheets comprises adding the at least one solvent to $MX_2$, where M is Mo, W, Bi, Sb, Ti, Pt, Nb, Ta, Ni, Zr, Hf, V, Ta, and Pd, and X is S, Se, Te, and NCl.

4. The method of claim 1, further comprising sonicating the transition metal dichalcogenide solution prior to freeze drying the solution.

5. The method of claim 4, wherein the sonicating is carried out for about 30 minutes to about 45 minutes, at a power of about 170 Watts (W) and a duty cycle of about 180 s/cycle.

6. The method of claim 1, wherein adding the at least one solvent comprises adding ethanol, methanol, isopropyl alcohol, or combinations thereof.

7. The method of claim 6, wherein adding the at least one solvent comprises adding the at least one solvent in a concentration of about 10% to about 15%.

8. The method of claim 1, wherein heating the frozen transition metal dichalcogenide is carried out in an inert atmosphere at a temperature of about 175° C. to about 250° C. for about 20 minutes to about 45 minutes.

9. The method of claim 1, wherein freeze drying the transition metal dichalcogenide solution comprises freezing the solution using ice bath and salt, lyophilization, or combinations thereof.

10. The method of claim 1, further comprising forming the transition metal dichalcogenide mixture by reacting a transition metal dichalcogenide with a cross-linking agent and an activating agent.

11. The method of claim 1, further comprising adding at least one inorganic oxide to the two-dimensional transition metal dichalcogenide sheets prior to freeze drying the transition metal dichalcogenide solution.

12. The method of claim 11, wherein adding the at least one inorganic oxide comprises adding boric oxide, barium oxide (BaO), praseodymium oxide ($Pr_2O_3$), lanthanide oxide ($Ln_2O_3$), manganese dioxide ($MnO_2$), or combinations thereof.

13. An aerogel made by the method of claim 1.

* * * * *